US009319381B1

(12) United States Patent
Jones et al.

(10) Patent No.: US 9,319,381 B1
(45) Date of Patent: Apr. 19, 2016

(54) SYSTEMS AND METHODS FOR SUPPLEMENTING CONTENT POLICY

(75) Inventors: Kendall Stuart Jones, Saratoga, CA (US); Erik D. Fears, Mountain View, CA (US)

(73) Assignee: Nominum, Inc., Redwood City, CA (US)

(*) Notice: Subject to any disclaimer, the term of this patent is extended or adjusted under 35 U.S.C. 154(b) by 569 days.

(21) Appl. No.: 13/275,171

(22) Filed: Oct. 17, 2011

(51) Int. Cl.
*H04L 29/06* (2006.01)
*G06F 21/55* (2013.01)

(52) U.S. Cl.
CPC .......... *H04L 63/0227* (2013.01); *G06F 21/552* (2013.01)

(58) Field of Classification Search
CPC . H04L 63/20; H04L 63/0281; H04L 63/0227; H04L 67/02; H04L 63/0236; H04L 63/1441; H04W 12/08; H04W 12/12; G06F 21/00; G06F 21/552; G06F 17/30861
USPC .......... 726/1, 12, 22; 709/203, 224, 225, 226, 709/229
See application file for complete search history.

(56) References Cited

U.S. PATENT DOCUMENTS

| | | | |
|---|---|---|---|
| 6,233,618 B1 | 5/2001 | Shannon | |
| 6,336,117 B1 | 1/2002 | Massarani | |
| 7,591,002 B2 | 9/2009 | Shelest et al. | |
| 9,026,597 B1* | 5/2015 | Emigh et al. | 709/206 |
| 9,191,393 B2 | 11/2015 | Tovar | |
| 2002/0169865 A1 | 11/2002 | Tarnoff | |
| 2003/0014659 A1 | 1/2003 | Zhu | |
| 2003/0028622 A1 | 2/2003 | Inoue et al. | |
| 2003/0065942 A1 | 4/2003 | Lineman et al. | |
| 2003/0123465 A1 | 7/2003 | Donahue | |
| 2003/0200442 A1 | 10/2003 | Bhat et al. | |
| 2005/0022229 A1 | 1/2005 | Gabriel et al. | |
| 2005/0277445 A1* | 12/2005 | Bae | 455/569.1 |
| 2006/0136595 A1 | 6/2006 | Satyavolu | |
| 2006/0173793 A1 | 8/2006 | Glass | |
| 2007/0118669 A1 | 5/2007 | Rand et al. | |
| 2007/0220145 A1* | 9/2007 | Kozakura et al. | 709/225 |

(Continued)

OTHER PUBLICATIONS

"Why does "the token URL has not been whitelisted" message display when trying to signup or log in?", Retrieved: Feb. 9, 2015, Published: Nov. 11, 2010, URL: https://getsatisfaction.com/getsatisfaction/topics/why_does_the_token_url_has_not_been_whitelisted_message_display_when_t rying_to_signup_or_log_in.*

(Continued)

*Primary Examiner* — Alexander Lagor
(74) *Attorney, Agent, or Firm* — Carr & Ferrell LLP

(57) ABSTRACT

A method for supplementing a content policy is provided. The method may include receiving a request to access network content associated with a network content, with the network content including additional network content associated with one or more linked network contents. The method may confirm that the network content is associated with the content policy. The content policy may include a list of pre-approved network contents. Based on the confirmation, the method may selectively provide access to the network content and apply the content policy to the additional network content associated with the one or more linked network contents. A policy enforcement module may determine whether or not the additional network content should be included in the network content, and, based on the determination, selectively allow inclusion of the additional network content within the network content.

18 Claims, 3 Drawing Sheets

(56) References Cited

U.S. PATENT DOCUMENTS

| | | |
|---|---|---|
| 2007/0294419 A1 | 12/2007 | Ulevitch |
| 2008/0208868 A1* | 8/2008 | Hubbard ........... G06F 17/30867 |
| 2008/0209057 A1 | 8/2008 | Martini et al. |
| 2009/0100513 A1 | 4/2009 | Coburn |
| 2009/0157889 A1 | 6/2009 | Treuhaft |
| 2009/0164597 A1 | 6/2009 | Shuster |
| 2010/0154024 A1 | 6/2010 | Boxmeyer et al. |
| 2011/0231927 A1 | 9/2011 | Tovar |
| 2015/0365441 A1 | 12/2015 | Lemon et al. |

OTHER PUBLICATIONS

Contavalli et al., Client IP information in DNS requests draft-vandergaast-edns-client-ip-00, Jan. 26, 2010, 20 pages.

* cited by examiner

SYSTEMS AND METHODS FOR SUPPLEMENTING CONTENT POLICY

FIELD OF THE INVENTION

This application relates generally to data processing and, more specifically, to systems and methods for supplementing a content policy.

DESCRIPTION OF RELATED ART

Content-control software is used to restrict content delivered over networks. The restrictions may be applied at various levels: a government can attempt to apply them nationwide, or the restrictions can, for example, be applied by an Internet Service Provider (ISP) to its clients, by an employer to its personnel, by a school to its students, by a library to its visitors, by a parent to a child's computer, or by an individual user to his or her own computer.

The motive is often to prevent viewing content considered objectionable. An ISP, for example, may block objectionable content before it enters the home, thereby helping parents who are worried about their children viewing objectionable content by offering access to only a set portion of Internet content.

To determine whether access should be granted, a whitelist of pre-approved domain names may be consulted. Whitelists are commonly used by ISPs and organizations to control content their users view. For example, an ISP may deny access to all websites except for the ones associated with domain names on the whitelist.

However, most modern websites incorporate content (e.g., images, JavaScript, Cascading Style Sheets (CSS) files, HyperText Markup Language (HTML) protocol, links, images, flash) from other websites so that other websites need to be accessed in order to properly construct the webpage. If the content-providing website is not on the whitelist, access can be denied and the webpage may appear completely broken (for example, having question marks instead of the intended content). Thus, developing intelligent content filtering technology may be difficult.

SUMMARY OF THE CLAIMED INVENTION

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

A method for supplementing a content policy may include receiving a request to access network content, with the requested network content including additional network content associated with linked network contents, confirming that the website is associated with the content policy, with the content policy including a list of pre-approved network contents, selectively providing access to the network content based on the confirmation, applying content policy to the additional network content associated with the linked network contents, utilizing a policy enforcement module to determine whether or not the additional network content can be included in the network content and, based on the determination, selectively allowing inclusion of the additional network content within the network content. The additional network content may include one or more of a downloadable application, HTTP response, remote procedure call, link, CSS, a Java script, media file, flash object, web sites, domains, web pages, web addresses, hyperlinks, URLs, any text, picture, and other media (such as video, audio, and any combination of audio and video), and any combination thereof.

In one embodiment, the application of the content policy may include determining whether a referring network content is associated with a whitelist, with the referring network content being a network content requesting the additional network content. The referring network content may be ascertained from the header of a Hypertext Transfer Protocol (HTTP) request sent by the network content requesting the additional network content. Per Internet Cooperation for Assigned Names and Numbers (ICANN) Internet Engineering Task Force (IETF) standards, that header is termed a "referer header." (Spelling intended.)

The method may further include allowing inclusion of the additional network content within the network content when there is no referer header in the HTTP request but the additional network content is independently associated with the whitelist.

The method may further include preventing inclusion of the additional network content within the network content if the network content is linked to the additional network content by more than a predetermined number of referring network contents. The application of the content policy may comprise determining whether a referring network content is cleared by the policy enforcement module for inclusion within the network content.

The method may further include temporarily applying a content policy to the network contents associated with the additional network content cleared by the policy enforcement module for inclusion within the network content. The determination as to whether the network content is associated with the whitelist may be based on a Domain Name System (DNS) address associated with the network content.

The method may further include ensuring that direct user linking from the additional network content cleared by the policy enforcement module for inclusion within the network content is not allowed unless the additional network content is associated with the whitelist.

The method may further include automatically associating a further network content redirected from the network content on the whitelist. The method may further include automatically associating a further network content with the whitelist if the further network content is included in a Canonical Name (CNAME) record associated with the network content.

In another example embodiment, applying the content policy may include pre-crawling the network content, determining that the linked network contents provide content for the network content based on predetermined criteria, and associating the linked network contents with the whitelist. The predetermined criteria may include a maximum number of linked network contents, popularity of the linked network contents, whether a direct access is possible, and whether there is an association with one or more blacklists. The method may further include periodically reapplying the content policy to the linked network contents based on the predetermined criteria.

In yet another example embodiment, applying the content policy may include compiling a specific list for the network content, with the specific list including addresses associated with the linked network contents and a degree of separation between the one or more linked network contents and the network content. The method may further include determining similarities between the content of the linked network contents and the content of the network content.

In further exemplary embodiments, modules, subsystems, or devices can be adapted to perform the recited steps. Other features and exemplary embodiments are described below.

BRIEF DESCRIPTION OF THE DRAWINGS

Embodiments are illustrated by way of example and not limitation in the figures of the accompanying drawings, in which like references indicate similar elements.

DETAILED DESCRIPTION

Figure 1:
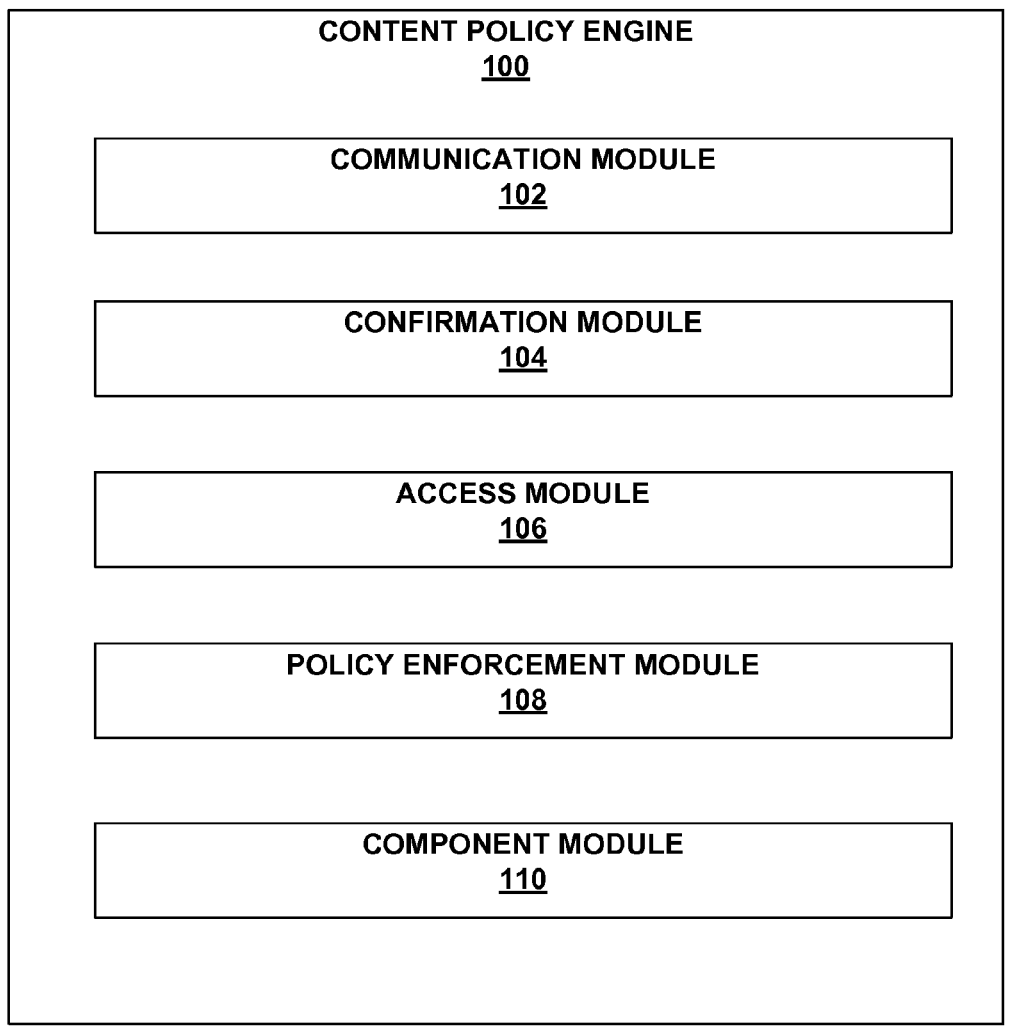
FIG. 1 is a block diagram of a content policy engine in accordance with an example embodiment.

Systems and methods for supplementing a content policy may allow access to the content needed to properly construct webpages complying with the content policy. Some example approaches for supplementing a content policy may include proactive (pre-selected) and reactive (on-the-fly) solutions.

In one example embodiment, a referer header may be used to allow enforcement engines to determine whether the referring network content is on a whitelist. The content may be allowed if it was requested on behalf of the network content that is on the whitelist or the content is chained to the network content that is on the whitelist by a succession of referer headers. Thus, all objects that need to be fetched to build a webpage associated with a network content on the whitelist may be allowed as long as they have a referer header associated with the network content on the whitelist. The number of links in the chain from the network content to the object may be limited. However, linking directly from a fetched object may be disallowed to prevent direct user access.

In another example embodiment, content needed to properly construct network contents complying with the content policy engine may be predetermined by crawling the whitelisted network contents ahead of time to determine what content is needed to build the requested page. For example, the top 10,000 network contents can be crawled and all incorporated content categorized. Using this approach, content needed to build these 10,000 pages can be whitelisted ahead of time. Top network contents may use common content, including, for example, social network links and hidden snippets of code that send information to web analytics engines. Additionally, much of the content common to top network contents may be delivered via Content Delivery Networks (CDN), such as Akamai.

The criteria used for the categorized content list may include common inclusion as components of the referred pages, such as, for example, content that is not readily accessed directly through a Uniform Resource Locator (URL) address (e.g., hidden web analytics snippets). There may be a limit on how many network contents are selected (for example, the 5,000 most popular network contents that provide content for the top 10,000 network contents may be selected). Because content may change often, this approach may require periodical rerunning algorithms in order to rebuild the lists.

In yet another approach, a list of network contents used to construct a specific network content can be compiled and analyzed. For example, it may be determined that Wikipedia.org typically requires 20 specific network contents (e.g., Wikimedia).

One common issue with using whitelists is redirection to other network contents due to multiple mirror servers serving the same content. This may be solved by whitelisting all CNAMEs associated with the whitelisted network content. A CNAME record is a type of resource record in the DNS that specifies that the domain name is an alias of another domain name. CNAMEs may be utilized when running multiple services from a single Internet Protocol (IP) address.

Another approach to addressing the redirection problem may include trusting all redirection from a whitelisted network content and temporarily adding the target sites to the whitelist.

It should be noted that in this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

FIG. 1 is a block diagram of a content policy engine 100, in accordance with an example embodiment. In some example embodiments, the content policy engine 100 may include a communication module 102, a confirmation module 104, an access module 106, a policy enforcement module 108, and a component module 110.

The communication module 102 may be configured to receive requests to access network content associated with a network content, which includes additional network content associated with linked network contents. The confirmation module 104 may be configured to confirm that the network content is associated with a content policy. The access module 106 may be configured to selectively provide access to the network content based on the confirmation provided by the confirmation module 104.

The policy enforcement module 108 may be configured to apply content policy to the additional network content associated with the linked network contents and to determine whether or not the additional network content can be included in the network content. The component module 110 may be configured to selectively allow inclusion of the additional network content within the network content based on the determination made by the policy enforcement module 108. The policy enforcement module 108 may further determine whether a referring network content is associated with the content policy.

Figure 2:
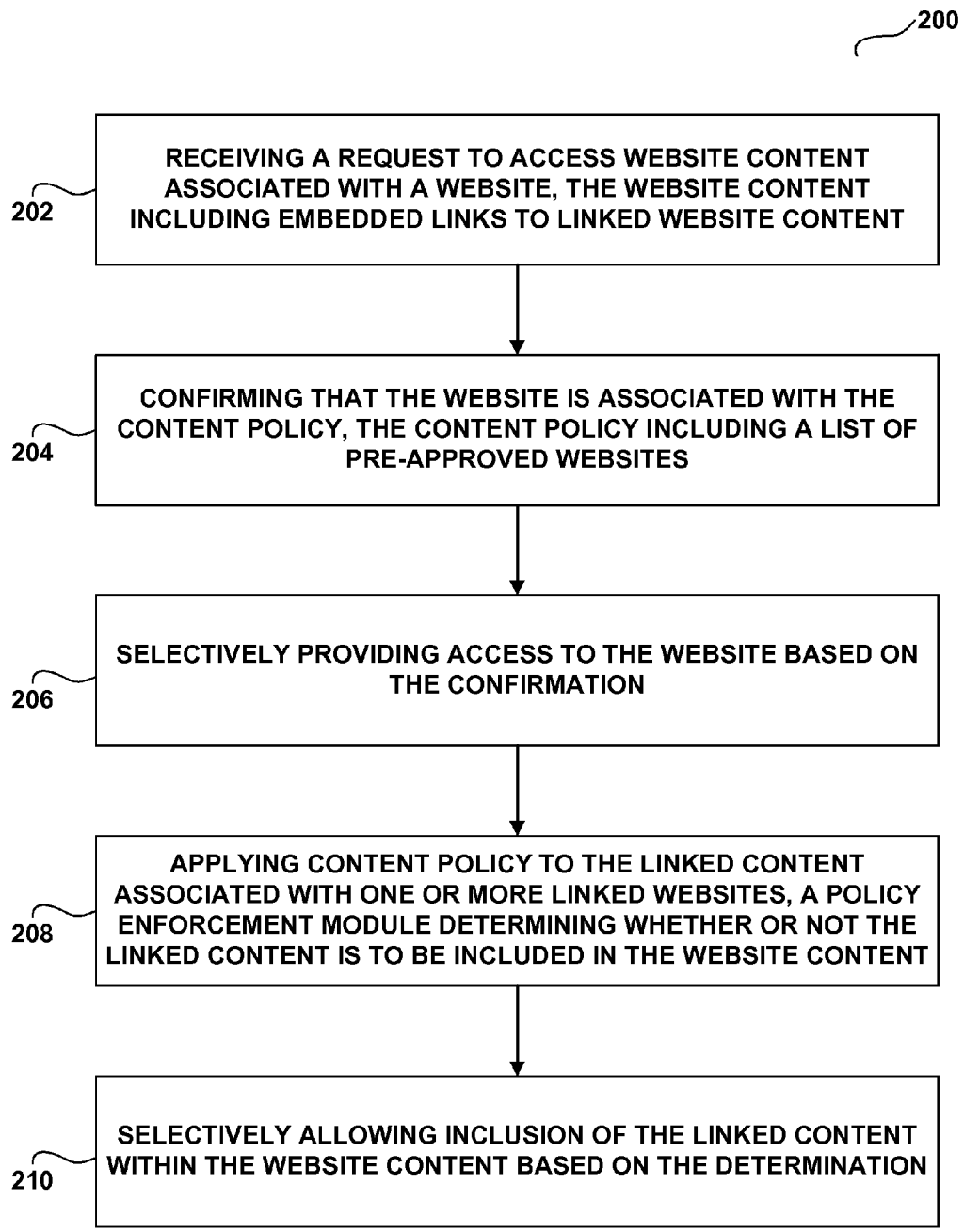
FIG. 2 illustrates a flow chart of a method for supplementing a content policy.

FIG. 2 illustrates a flow chart of a method 200 for supplementing a content policy, in accordance an example embodiment. The method 200 may be performed by processing logic that may comprise hardware (e.g., dedicated logic, programmable logic, microcode, etc.), software (such as run on a general-purpose computer system or a dedicated machine), or a combination of both. In one exemplary embodiment, the processing logic resides at the content policy engine 100, as illustrated in FIG. 1.

The method 200 may commence at operation 202 with the communication module 102 receiving a request to access network content associated with a network content. The network content may include additional network content associated with linked network contents. The additional network content may include one or more of a downloadable application, HTTP response, remote procedure call, link, CSS, a Java script, media file, flash object, web sites, domains, web pages, web addresses, hyperlinks, URLs, any text, picture, and other media (such as video, audio, and any combination of audio and video), and any combination thereof. At operation 204, the confirmation module 104 may confirm that the network content is associated with a content policy. For example, the determination may be based on a DNS address associated with the network content. The content policy may include a list of pre-approved network contents.

At operation 206, based on the confirmation provided by the confirmation module 104 at operation 204, the access module 106 may provide selective access to the network content. At operation 208, the policy enforcement module 108 may apply content policy to the additional network content associated with the linked network contents. The policy enforcement module 108 may determine whether the additional network content can be included in the network content at operation 210.

In one example embodiment, applying the content policy may include determining whether a referring network content is associated with a whitelist. The referring network content may include a network content requesting the additional network content. The referring network content may be ascertained from a referer header of an HTTP request sent by the network content requesting the additional network content. The additional network content may be included within the network content when there is no referer header in the HTTP request but the additional network content is independently associated with the whitelist. The inclusion of the additional network content within the network content can be prevented if the first network content is linked to the further content by more than a predetermined number of referring network contents.

The application of the content policy may comprise determining whether the referring network content is cleared by the policy enforcement module 108 for inclusion within the network content. If network contents are cleared for inclusion, the may be associated with the additional network content and temporarily whitelisted by the policy enforcement module 108. Even though the additional network content may be cleared for inclusion in the network content, direct user linking from the additional network content may still be disabled.

In another example embodiment, applying the content policy may include pre-crawling the network content and ascertaining the linked network contents that are providing content for the network content. If the linked network contents satisfy certain predetermined criteria, they may be associated with the whitelist. The predetermined criteria may include a maximum number of linked network contents, popularity of the linked network contents, whether a direct access is possible, and whether there is an association with one or more blacklists. Because the content may change often, the content policy may be periodically reapplied based on the predetermined criteria.

In yet another example embodiment, applying the content policy may include compiling a specific list for the network content. The specific list may include addresses associated with the linked network contents and a degree of separation between the linked network contents and the network content. The policy enforcement module may determine similarities between the content of the linked network contents and the content of the network content.

If a user is redirected to a further network content, the policy enforcement module 108 may automatically associate the further network content with the whitelist. Additionally, the policy enforcement module 108 may automatically associate the further network content with the whitelist if the further network content is included in a CNAME record associated with the network content.

Figure 3:
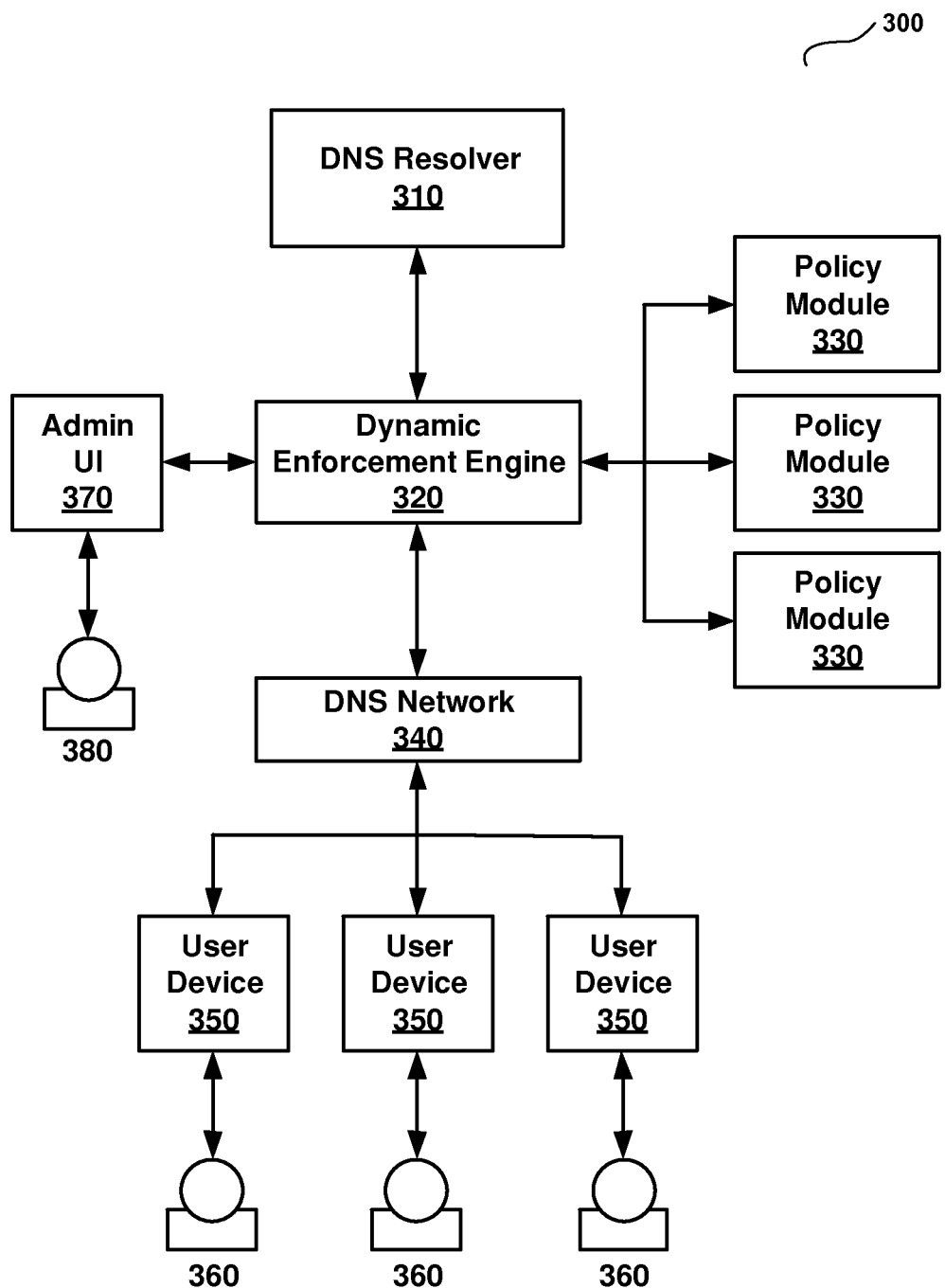
FIG. 3 is a block diagram of a DNS resolver environment.

FIG. 3 illustrates an exemplary Internet service system 300, with a DNS resolver 310, that may be utilized to support the above described systems and methods. A DNS resolver 310 operates in conjunction with a dynamic enforcement engine 320. The dynamic enforcement engine 320 may operate in conjunction with one or more policy modules 330 to establish any applicable polices at the DNS resolver 310 level and in conjunction with an administrator user interface 370 and administrator 380. The content rules are applied to received user queries to determine which content is delivered by the DNS network 340 through various user devices 350 to the network users 360.

The dynamic enforcement engine 320 may generate its policy engine on instructions received from one or more policy modules 330. Each policy module 330 may be constructed to provide various types and levels of services to the DNS network 340. In various embodiments, a policy module 330 may be configured to handle queries directed to subjects including, but not limited to, malicious domain redirection, user access redirection, non-existent domain redirection, and data collection or analysis.

An embodiment of the present invention may be implemented by a computing system in the context of user devices, DNS Resolver, and the like. The computing system includes one or more processors and a main memory. The main memory stores, in part, instructions and data for execution by a processor. The main memory can store the executable code when the system is in operation. The system may further include a mass storage device, portable storage drive(s), output devices, user input devices, a display system, and other peripheral devices.

The components of the computing system may be connected via a single bus. The components may be connected through one or more data transport means. The processor and the main memory may be connected via a local microprocessor bus, and the mass storage device, peripheral device(s), portable storage medium drive, and display system may be connected via one or more input/output (I/O) buses.

The mass storage device, which may be implemented with a magnetic disk drive or an optical disk drive, is a non-volatile storage device for storing data and instructions for use by the processor. The mass storage device can store the system software for implementing embodiments of the present invention for purposes of loading that storage into the main memory.

The portable storage medium drive operates in conjunction with a portable non-volatile storage medium, such as a floppy disk, compact disk (CD), or digital video disk (DVD), to input and output data and code to and from the computing system. The system software for implementing embodiments of the present invention may be stored on such a portable medium and input to the computer system via the portable storage medium drive.

Input devices provide a portion of the user interface. The input devices may include an alpha-numeric keypad, such as a keyboard, for inputting alpha-numeric and other information, or a pointing device, such as a mouse, trackball, stylus, or cursor direction keys. Additionally, the system includes output devices. Suitable output devices include speakers, printers, network interfaces, and monitors.

The display system may include a liquid crystal display (LCD) or other suitable display device. The display system receives textural and graphical information and processes the information for output to the display device.

The peripheral device(s) may include any type of computer support device to add additional functionality to the computer system. The peripheral device(s) may include a modem or a router.

The components contained in the computer system are those typically found in computer systems that may be suitable for use with embodiments of the present invention and are intended to represent a broad category of such computer components that are well known in the art. Thus, the computer system can be a Personal Computer (PC), hand held computing device, telephone, mobile computing device, workstation, server, minicomputer, mainframe computer, or any other computing device. The computer can also include different bus configurations, networked platforms, multi-processor platforms, and so forth. Various operating systems can be used, including UNIX, Linux, Windows, Macintosh Operating System (OS), Palm OS, and other suitable operating systems.

Some of the above-described functions may be composed of instructions that are stored on storage media (e.g., a computer-readable medium). The instructions may be retrieved and executed by the processor. Some examples of storage media are memory devices, tapes, disks, and the like. The instructions are operational when executed by the processor to direct the processor to operate in accord with the invention. Those skilled in the art are familiar with instructions, processor(s), and storage media.

It is noteworthy that any hardware platform suitable for performing the processing described herein is suitable for use with the invention. The terms "computer-readable storage medium" and "computer-readable storage media" as used herein refer to any medium or media that participate in providing instructions to a Central Processing Unit (CPU) for execution. Such media can take many forms, including, but not limited to, non-volatile media, volatile media and transmission media. Non-volatile media include, for example, optical or magnetic disks, such as a fixed disk. Volatile media include dynamic memory, such as system Random Access Memory (RAM). Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, a DVD, any other optical medium, any other physical medium with patterns of marks or holes, a RAM, a PROM, an EPROM, an EEPROM, a FLASHEPROM, any other memory chip or cartridge, or any other medium which can be read by a computer.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents. While the present invention has been described in connection with a series of embodiments, these descriptions are not intended to limit the scope of the invention to the particular forms set forth herein. It will be further understood that the methods of the invention are not necessarily limited to the discrete steps or the order of the steps described. To the contrary, the present descriptions are intended to cover such alternatives, modifications, and equivalents as may be included within the spirit and scope of the invention as defined by the appended claims and otherwise appreciated by one of ordinary skill in the art. For example, this description describes the technology in the context of an Internet service in conjunction with a DNS resolver. It will be appreciated by those skilled in the art that functionalities and method steps that are performed by a DNS resolver may be performed by an Internet service. One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the invention as described herein.

One skilled in the art will further appreciate that the term "network content" comprises one or more of a downloadable application, HTTP response, remote procedure call, link, CSS, a Java script, media file, flash object, web sites, domains, web pages, web addresses, hyperlinks, URLs, any text, picture, and other media (such as video, audio, and any combination of audio and video), and any combination thereof.

While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel, or may be performed at different times.

From the foregoing, it will be appreciated that specific embodiments of the system have been described herein for purposes of illustration, but that various modifications may be made without deviating from the spirit and scope of the system. Accordingly, the system is not limited except as by the appended claims.

What is claimed is:

1. A method for supplementing a content policy, the method comprising:
   receiving a request to access network content, the network content including first embedded links to additional network content, in which the access to the network content is provided by an Hypertext Transfer Protocol (HTTP) request, and the network content is an HTTP response;
   confirming that the additional network content is associated with the content policy, the content policy including a list of pre-approved network content;
   applying the content policy to the additional network content associated with one or more linked addresses, a policy enforcement module determining whether or not the additional network content is to be allowed;

allowing inclusion of the additional network content within the network content when the additional network content is allowed; and preventing inclusion of the additional network content within the HTTP response if the network content is linked to the additional network content by more than a predetermined number of referring network contents.

2. The method of claim 1, wherein the additional network content associated with one or more linked addresses is ascertained from a referer header of an HTTP request sent on behalf of the network content requesting the additional network content.

3. The method of claim 1, further comprising applying a supplemental policy to the additional network content associated with referring network content if the referring network content is not associated with a whitelist, the referring network content being a network content requesting the additional network content.

4. The method of claim 1, wherein applying the content policy comprises determining whether the HTTP request with a referer header is allowed by the policy enforcement module.

5. The method of claim 1, further comprising temporarily modifying and applying the content policy to the one or more network contents associated with the additional network content cleared by the policy enforcement module for inclusion within the network content.

6. The method of claim 5, wherein the content policy is temporarily modified based on an HTTP redirect.

7. The method of claim 1, wherein the content policy is implemented through the policy enforcement module based on a Domain Name System (DNS) address associated with the network content.

8. The method of claim 1, further comprising ensuring that direct linking, via a user action, from the additional network content allowed by the policy enforcement module for inclusion within the network content is allowed only if the additional network content is associated with the content policy.

9. The method of claim 1, further comprising automatically associating a further network content redirected via a DNS from the network content with the content policy.

10. The method of claim 1, wherein the additional network content includes one or more of a text, a second link, a Cascading Style Sheet (CSS), a Java script, a media file, and a flash object.

11. The method of claim 1, wherein the method further includes:
pre-crawling the network content;
determining that one or more of the linked network contents associated with the network content is acceptable to provide content for the network content based on predetermined criteria; and
associating the one or more of the linked network contents with the content policy.

12. The method of claim 11, wherein the predetermined criteria includes one or more of a maximum number of linked network contents, popularity of the linked network content, whether a direct access to the linked network contents is possible, and whether there is an association of the linked network content with the content policy.

13. The method of claim 11, further comprising periodically reapplying the content policy to the one or more linked network contents based on the predetermined criteria.

14. The method of claim 1, wherein applying the content policy includes compiling a specific list for the network content, the specific list including one or more addresses associated with the one or more linked network contents and a degree of separation between the one or more linked network contents and the network content.

15. The method of claim 13, further comprising determining similarities between the content of the one or more linked network contents and the content of the network content.

16. A system for supplementing a content policy, the system comprising:
a processor;
a memory;
a communication module, stored in the memory, that receives a request to access network content associated with a network content, in which access to the network content is provided by an Hypertext Transfer Protocol (HTTP) request, and the network content is an HTTP response, the network content including additional network content associated with one or more linked network contents;
a confirmation module, stored in the memory, that confirms that the network content is associated with the content policy, the content policy being a list of pre-approved network contents;
a policy enforcement module, stored in the memory, that applies the content policy to the additional network content associated with the one or more linked network contents, the policy enforcement module determining whether or not the additional network content can be included in the network content; and
a component module, stored in the memory, that selectively allows inclusion of the additional network content within the network content based on the determination, the component module preventing inclusion of the additional network content within the HTTP response if the network content is linked to the additional network content by more than a predetermined number of referring network contents.

17. The system of claim 16, wherein the policy enforcement module further determines whether a referring network content is associated with a whitelist, the referring network content being a network content requesting the additional network content.

18. A non-transitory computer readable storage medium having a program embodied thereon, the program executable by a processor in a computing device to perform a method for supplementing a content policy, the method comprising:
receiving a request to access network content associated with a network content, the network content including additional network content associated with one or more linked network contents, the access to the network content provided by an Hypertext Transfer Protocol (HTTP) request and the network content is an HTTP response;
confirming that the network content is associated with the content policy, the content policy being a list of pre-approved network content;
based on the confirmation, selectively providing access to the network content;
applying the content policy to the additional network content associated with the one or more linked network contents, a policy enforcement module determining whether or not the additional network content can be included in the network content; and
based on the determination, selectively allowing inclusion of the additional network content within the network content and preventing inclusion of the additional network content within the HTTP response if the network content is linked to the additional network content by more than a predetermined number of referring network contents.

\* \* \* \* \*